United States Patent

Ehrler et al.

[11] Patent Number: 4,820,467
[45] Date of Patent: Apr. 11, 1989

[54] PROCESS FOR THE PUNCHING AND REMOVING OF THE SPRUE IN AN INJECTION MOLDING TOOL

[75] Inventors: Ernst Ehrler, Munich; Martin Eichlseder, Tettenweis; Edmund Theiss, Freising, all of Fed. Rep. of Germany

[73] Assignee: Krauss-Maffei A.G., Fed. Rep. of Germany

[21] Appl. No.: 111,072

[22] Filed: Oct. 19, 1987

Related U.S. Application Data

[62] Division of Ser. No. 799,337, Nov. 18, 1985, Pat. No. 4,715,806.

[30] Foreign Application Priority Data

Nov. 16, 1984 [DE] Fed. Rep. of Germany ....... 3442023

[51] Int. Cl.$^4$ ............................................. B29C 45/38
[52] U.S. Cl. ................... 264/161; 264/328.1; 264/334; 264/335
[58] Field of Search ..................... 264/106, 107, 328.1, 264/571, 334, 335, 161; 425/553, 554, 556, 577, 810, DIG. 58, DIG. 51, 436 R, 436 RM, 437, 441, 443; 83/914

[56] References Cited

U.S. PATENT DOCUMENTS

| 2,992,455 | 7/1961 | Salzman | 425/562 |
| 3,112,523 | 12/1963 | Goulet et al. | 425/542 |
| 3,649,728 | 3/1972 | Honsho et al. | 264/40 |
| 4,185,955 | 1/1980 | Holmes et al. | 425/542 |
| 4,260,360 | 4/1981 | Holmes et al. | 425/548 |
| 4,372,741 | 2/1983 | Cane et al. | 425/556 |
| 4,466,934 | 9/1984 | Cane et al. | 264/106 |

FOREIGN PATENT DOCUMENTS

| 0051253 | 10/1981 | European Pat. Off. |
| 1081216 | 5/1960 | Fed. Rep. of Germany . |
| 1938801 | 9/1973 | Fed. Rep. of Germany . |
| 2838634 | 5/1979 | Fed. Rep. of Germany . |
| 3135258 | 10/1982 | Fed. Rep. of Germany . |
| 2109327 | 5/1972 | France . |
| 453671 | 10/1965 | Switzerland . |

Primary Examiner—Jan H. Silbaugh
Assistant Examiner—Jill L. Heitbrink
Attorney, Agent, or Firm—Robert J. Koch

[57] ABSTRACT

A sprue part is cut and removed from the injection mold part during the manufacture of information storage disks by an injection molding process. The highly sensitive molding of an information storage disk is protected from damage by the sprue and the deposition of dust particles during stripping by this process. The sprue is punched into a part serving as the die of the injection molding tool and subsequently removed, in particular by suction, through an orifice leading from inside the part, together with the dust particles generated in the punching process. Preferably, the sprue is punched out and removed with the injection molding tool closed. The injection molding tool must be opened only after the sprue and the dust have already been removed, thus ensuring that the molded product has an especially good quality.

12 Claims, 4 Drawing Sheets

PROCESS FOR THE PUNCHING AND REMOVING OF THE SPRUE IN AN INJECTION MOLDING TOOL

This application is a divisional of application Ser. No. 799,337, filed Nov. 18, 1985, the disclosure of which is incorporated herein now U.S. Pat. No. 4,715,806.

BACKGROUND OF THE INVENTION

1. Field of the Invention

The invention relates to a process and an apparatus for the punching and removal of the sprue in a two-part injection molding tool, particularly to a process for manufacturing information carrying disks by injecting synthetic thermoplastic material into a cavity of a two-part molding tool and punching the resulting sprue by axially displacing parts of the molding tool.

The configuration of the sprue cavity serves to deflect by 90° the liquid synthetic plastic arriving from a runner of the machine nozzle and introduce the plastic to the mold cavity uniformly over the circumference of the cavity. A sprue formed in the sprue cavity during the injection molding process must be cut from the molded product and removed after a cooling phase.

2. Description of the Prior Art

West German DE-OS No. 28 38 634 shows using an ejector to separate a sprue from a single piece annular injection molding by punching the sprue from the molding The punching and ejector apparatus is placed in part of an essentially two-part mold opposite to a part of the mold with an injection nozzle. The punching apparatus consists of an annular mold part and a punch, the terminal section of which separates the sprue from the annular part in cooperation with the mold part. In this process the two-part injection molding tool or injection mold is opened, by moving the two parts of the mold apart from each other. The separation of the two mold parts is effected in two steps. Initially, to the extent only that the sprue held, an undercut is punched in the free space created by means of a hydraulically actuated tubular ejector, where it is still being held by means of the undercut in its axial position. The mold is then opened completely and the sprue ejected by means of an ejector pin guided in a tubular ejector from the undercut, so that it drops downward in the parting plane of the injection molding tool.

SUMMARY OF THE INVENTION

In the production of information carrying disks by the injection molding process, such as sound and image carrying disks, requirements concerning precision and freedom from dust are very high. In particular, the disks are extremely sensitive to damage and impurities during their removal from the mold. Thus, a dropping sprue part may damage the injection molded article and dust particles released in the course of the punching and ejection process may settle on it and interfere with the reproduction quality of the disk. Dust may also settle in the mold, particularly on the die plate used in this production process in the injection molding tool, which in a subsequent molding process would be embedded in the product. The reproduction quality of a disk manufactured in this manner would be strongly affected and possibly render the disk unusable.

It is an objective of the invention to provide means in an injection molding tool for punching and ejection of a sprue part to safely avoid damage to a molded article by the sprue itself and/or by deposition of dust particles released in the punching process on the article and the mold.

This object is attained by utilizing a process for punching and removal of the sprue in an essentially two-part injection molding tool for synthetic thermoplastic material. The two parts are arranged in an axially displaceable manner with respect to each other. The punching of the sprue is effected axially, wherein the sprue is punched into a part of the injection molding tool serving as a die and subsequently removed together with dust particles generated by the punching process through an orifice leading out from the part.

The punching and ejection of the sprue part is performed with the mold closed, i.e., the two parts of the mold are opened for the ejection of the molded product only after the sprue, together with the dust particles generated by the punching process, have been removed. This leads to a particularly high quality molded product.

The opening leading to the outside may be arranged so that the sprue and other impurities may drop out downward. Dust particles generated in the punching process may be eliminated with a special thoroughness by means of suction through the orifice. This is highly important in the injection molding of information carrying disks, as the setting of even the smallest particles would significantly affect the quality of reproduction.

In an embodiment of the invention, an injection nozzle, a punch die for punching of the sprue and an axially mobile, tubular ejector with an injector pin guided in said ejector are provided. The punch die or the matrix die, respectively, are arranged in a first part of the injection molding tool which also contains an injection nozzle. The opposing part of the injection molding tool contains the tubular ejector guided together with the ejector pin in a sleeve, the frontal side facing the punch die of which forms the die for the punch. The jacket of the sleeve comprises an orifice permitting the passage and the suctioning off of the sprue. Herein the punch is arranged on the nozzle side and a sleeve is provided as a guide for the ejector in the opposing part of the injection molding tool.

The ejector with the ejector pin is axially retracted upon punching the sprue, taking the sprue part, which is held by one or several undercuts in the ejector. The ejector is retracted in the same direction until the sprue part is located in the area of the opening or orifice and is ejected by the ejector pin. The sprue part is then removed through the opening, together with the dust generated by the punching process.

The apparatus according to the invention may be advantageously embodied so that the nozzle body serves as the punch die.

In an advantageous embodiment, the punch die is equipped at its frontal part with a bore conically tapered toward the rear. The function of the bore is to receive the sprue cone, to introduce the nozzle runner, and subsequently surround the nozzle body. The nozzle body has a funnel-like sleeve expanding toward the rear and arranged within the first part of the injection molding tool. The nozzle body is arranged in an axially displaceable manner with respect to the punch die. The punch die surrounds the nozzle body in the form of a sleeve and is mounted in an axially mobile manner with respect to the punch die. This embodiment makes it possible to retract the nozzle body with the jet following the injection process, thereby effecting a thermal separation of the nozzle body from the punch die. In this manner, the punch die and thus the cone of the sprue may be well cooled to facilitate stripping, while the retracted nozzle jet is reheated and is able to hold liquid synethetic thermoplastic material for subsequent injection. The axial movement of the punch die may be effected while the injection molding tool is closed by a hydraulically actuated wedge-shaped fork or a slide.

The ejector is equipped with one or several undercuts for the sprue. In this manner, the sprue is held securely in the ejector until it is ejected by the ejector pin.

Further suitable devices are apparent for the process according to the invention. Thus, for example, the opening leading out from the injection molding tool may also be placed in the area of the nozzle body. In this case, the punching of the sprue would be effected by the ejector, with the nozzle body being correspondingly retracted. The scope of the invention is not limited by the embodiments described. Other embodiments may be devised without departing from the scope and spirit of the invention.

DETAILED DESCRIPTION OF THE PREFERRED EMBODIMENT

Figure 1:
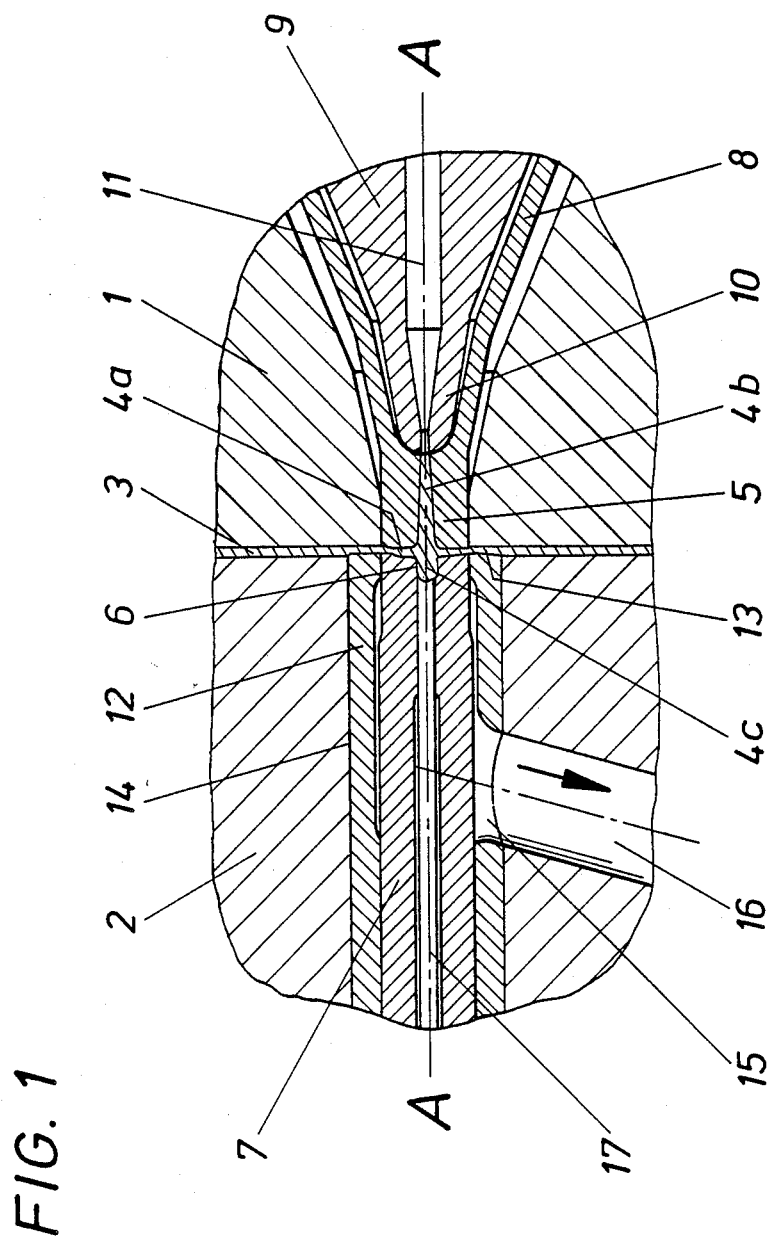
FIG. 1 shows an axial section of a two-part injection molding tool with an injection molded part.

FIG. 1 shows a section an injection molding tool which comprises two parts 1 and 2, arranged around axis A-A displaceably in the axial direction. A cavity is formed and is filled by the sprue 4 and an injection molded part 3 between the parts 1 and 2.

The sprue 4 is integrally joined to the molding 3 by a sprue disk 4a. A sprue cone 4b extends into the punch die and is held by a lug 4c in an undercut 6 of an ejector 7. The punch die 5 widens into a funnel-shaped sleeve 8, which surrounds a nozzle body 9 with a nozzle jet and a nozzle runner 11. The punch die 5 and the nozzle body 9 are displaceable independently of each other within the part 1.

The ejector 7 is also displaceable axially in the sleeve 12, which on its frontal side 13 forms a die for the punch 5. The jacket 14 of the sleeve 12 comprises an orifice 15, opening into a canal 16 in the part 2. Within the ejector 7, an ejector pin 17 is guided in an axially displaceable manner.

In the course of the molding process the liquid synthetic plastic material passes through the runner 11 into the cavity between the two parts 1 and 2 of the injection molding tool, forming the sprue cone 4b and the sprue disk 4a, together with the lug 4c, thereby shaping the molding 3.

Figure 2:
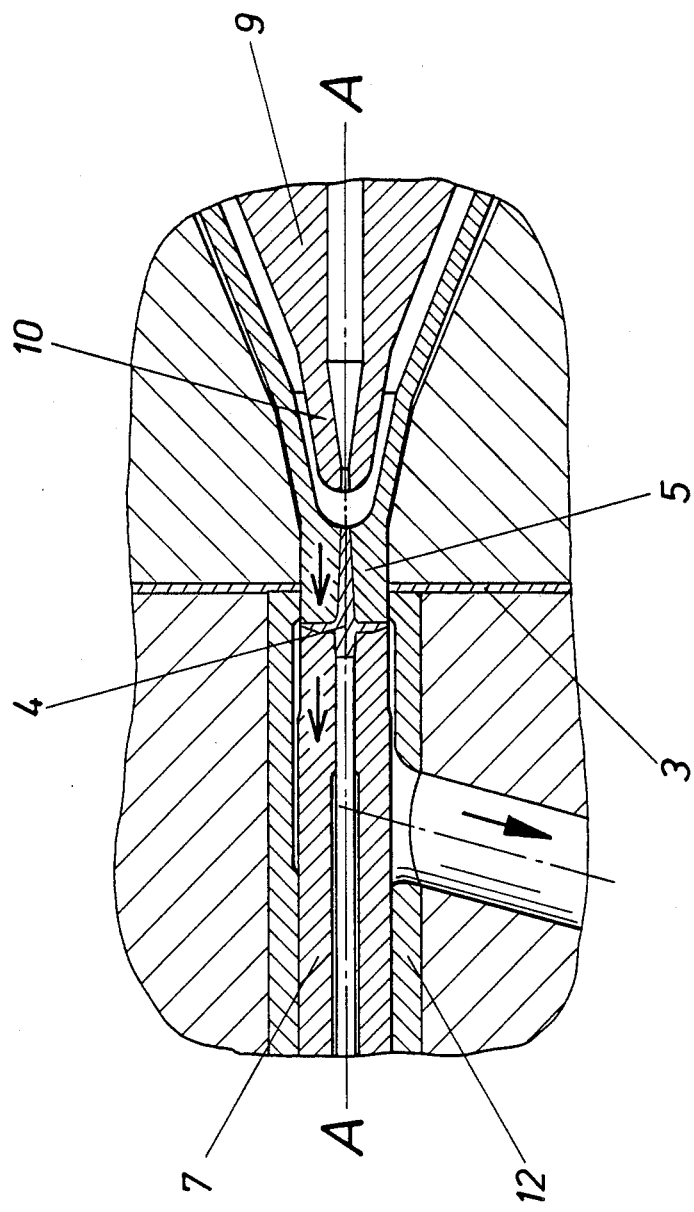
FIG. 2 shows a section according to FIG. 1 after the punching of the sprue.

Following the cooling and hardening of the sprue 4 and the molding 3, the sprue part 4 is punched out as shown in FIG. 2. Hydraulic pressure applied to the ejector 7 is reduced so that the ejector may retract axially under the pressure of the punch die 5.

The punch die 5 is moved in the closed state of the injection molding tool by a hydraulically actuated wedge-shaped fork, not shown, and it punches the sprue disk 4a from the molding 3, thereby stamping the sprue 4 into the sleeve 12 serving as the die.

Figure 3:
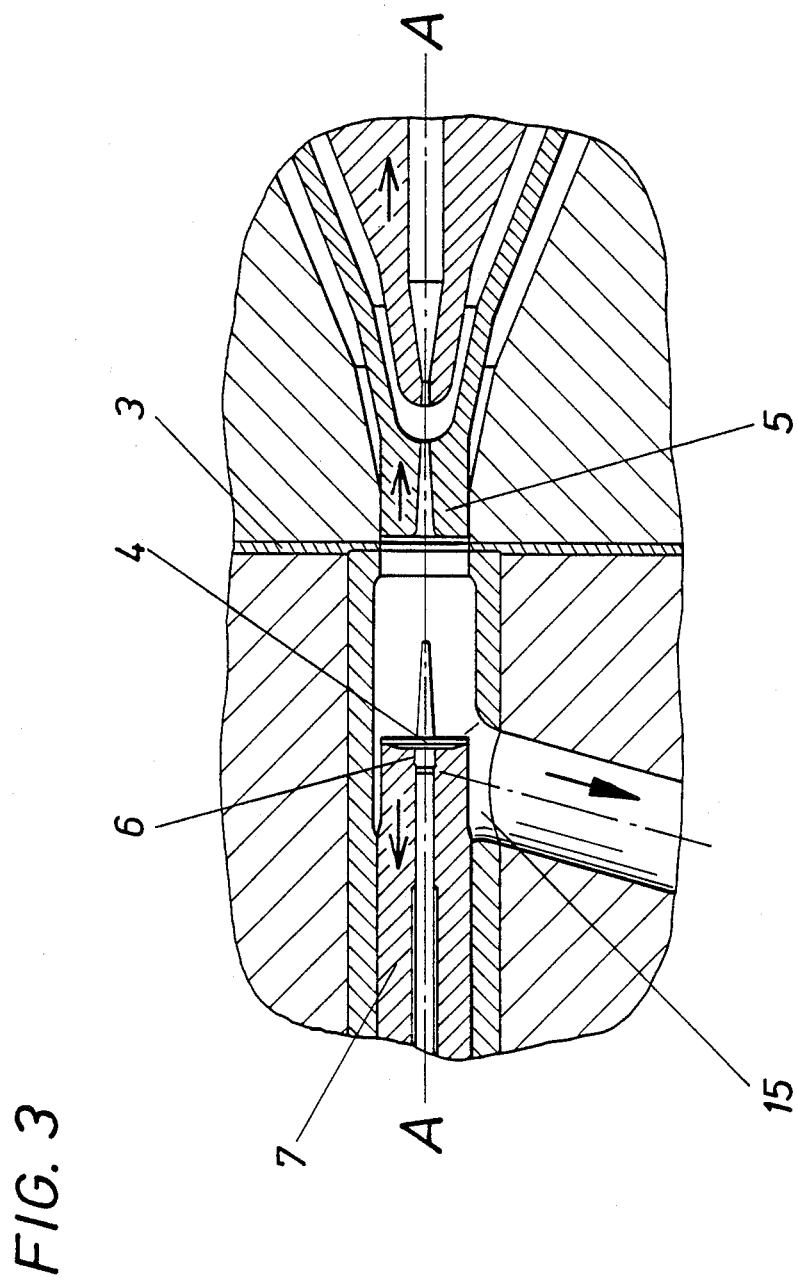
FIG. 3 shows the section according to FIGS. 1 and 2 with the ejector retracted.

FIG. 3 shows the punch-die 5 in its retracted position, while the ejector 7 is moved further back and is now located in the area of the orifice 15. The sprue part 4 is held in the ejector by the undercut 6. The nozzle body 9 is retracted with its nozzle jet 10 prior to the retraction of the punch die 5 in order to attain an effective thermal separation between the nozzle body 9 and the punch die 5. In this manner, the sprue area in the punch die and thus the sprue cone may be cooled well for stripping, while the retracted nozzle jet is reheated rendering the synthetic plastic material available for the next injection.

Figure 4:
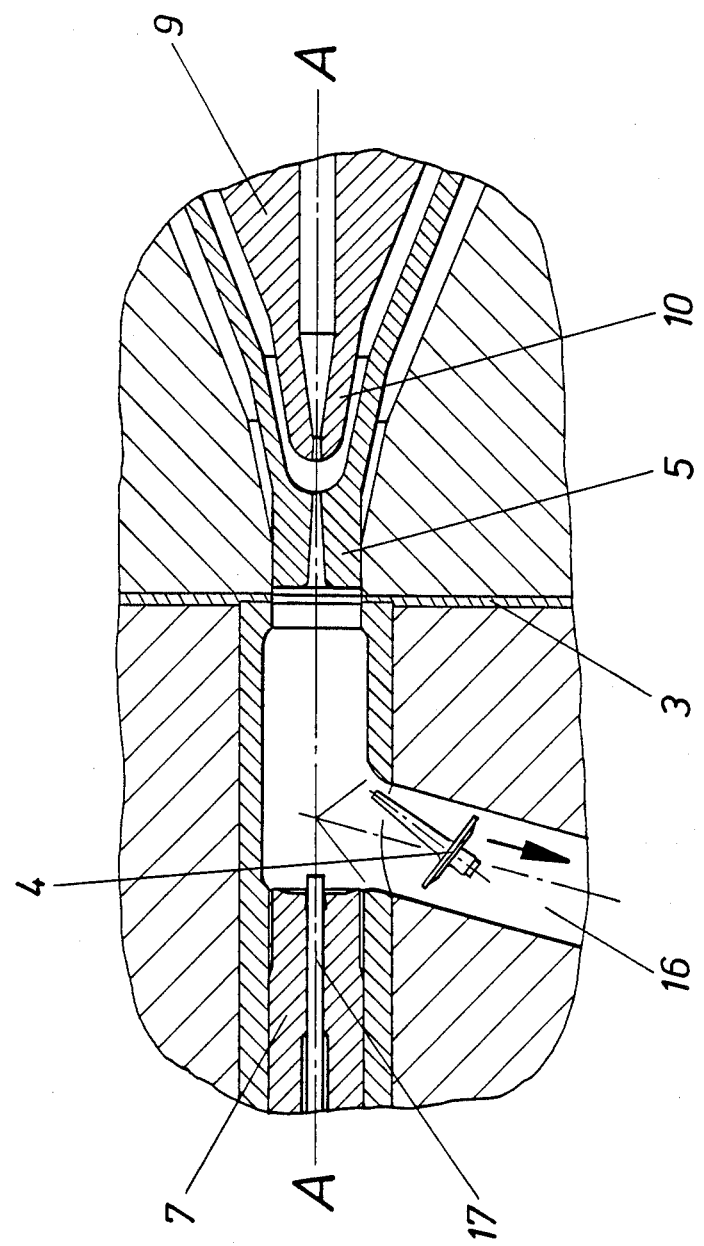
FIG. 4 shows the ejection of the sprue.

As shown in FIG. 4, the sprue part 4 is then ejected by a forward movement of the ejector pin 17 causing the sprue to drop through the orifice 15 into the canal 16, from which it is suctioned off together with the dust particles generated by a suction device (not shown).

Subsequently, the two parts 1 and 2 of the injection molding tool are moved apart so that the highly sensitive molding 3 may be removed without the risk of being damaged by a dropping sprue part or the deposition of dust.

What is claimed is:

1. A method of punching and removal of a sprue part of a molded article in a two-part injection molding tool wherein the two parts are axially displaceable with respect to each other comprising the steps of:
axially punching the sprue part into a part of the injection molding tool past a die;
removing the sprue part and dust particles generated in the punching step from the injection molding tool through an orifice leading out from the injection portion of the injection molding tool by suctioning the sprue part and the dust particles generated by the step of punching through the orifice.

2. A method as in claim 1 wherein the two parts of the injection molding tool are in a closed position throughout the steps of punching and removing.

3. A method according to claim 1 wherein the step of axially punching is performed by axial advancement of a punch exhibiting an injection orifice.

4. A method for producing apertured articles from thermoplastic comprising the sequential steps of:
closing a two-part molding tool so that an article cavity is defined between the two parts and a sprue cavity is defined by a punch arranged in a first part of the molding tool and an ejector aligned with the punch arranged in a second part of the molding tool;
injecting thermoplastic into said article cavity through said sprue cavity forming an article and a sprue;
displacing said punch and ejector simultaneously in the same direction, thereby punching said sprue from said article and displacing said sprue into a sleeve within the second par;
retracting said punch;
ejecting said sprue from said ejector;
removing said sprue from said molding tool through an orifice in said sleeve;
opening said molding tool only after removal of said sprue.

5. A method as in claim 4 wherein the step of removing is aided by suction.

6. A method as in claim 5 wherein the thermoplastic is injected from a nozzle body and wherein said nozzle body is retracted from said punch in order to effect a thermal separation of said nozzle body from said punch subsequent to injection of said thermoplastic.

7. A method as in claim 6 wherein said ejector includes at least one undercut for holding said sprue during the step of retracting said punch.

8. A method as in claim 5 wherein said ejector includes at least one undercut for holding said sprue during the step of retracting said punch.

9. A method as in claim 4 wherein the thermoplastic is injected from a nozzle body and wherein said nozzle body is retracted from said punch in order to effect a thermal separation of said nozzle body from said punch subsequent to injection of said thermoplastic.

10. A method as in claim 4 wherein said ejector includes at least one undercut for holding said sprue during the step of retracting said punch.

11. A method as in claim 4 wherein said step of removing further comprises removal of dust particles generated during the steps of displacing, retracting and ejecting and is aided by suction.

12. A method according to claim 4 wherein the step of injecting further comprises introduction of said thermoplastic through an injection orifice in said punch.

* * * * *